United States Patent
Shang et al.

(10) Patent No.: US 11,925,928 B2
(45) Date of Patent: Mar. 12, 2024

(54) SELF-CLEANING FABRIC AND ARTICLE

(71) Applicant: City University of Hong Kong, Kowloon (HK)

(72) Inventors: Jin Shang, Kowloon (HK); Tianqi Wang, Kowloon (HK); Mingzhe Sun, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 17/843,143

(22) Filed: Jun. 17, 2022

(65) Prior Publication Data

US 2023/0405572 A1    Dec. 21, 2023

(51) Int. Cl.
| | | |
|---|---|---|
| *B01J 31/16* | (2006.01) | |
| *B01J 29/70* | (2006.01) | |
| *B01J 31/06* | (2006.01) | |
| *B01J 37/02* | (2006.01) | |
| *B01J 37/03* | (2006.01) | |
| *B01J 37/04* | (2006.01) | |
| *B01J 37/08* | (2006.01) | |
| *B01J 37/34* | (2006.01) | |

(52) U.S. Cl.
CPC ............. *B01J 35/58* (2024.01); *B01J 29/70* (2013.01); *B01J 31/06* (2013.01); *B01J 31/1691* (2013.01); *B01J 35/39* (2024.01); *B01J 37/0219* (2013.01); *B01J 37/0236* (2013.01); *B01J 37/031* (2013.01); *B01J 37/04* (2013.01); *B01J 37/08* (2013.01); *B01J 37/342* (2013.01); *B01J 2231/005* (2013.01); *B01J 2531/26* (2013.01)

(58) Field of Classification Search
CPC ... B01J 35/06; B01J 29/70; B01J 31/06; B01J 31/1691; B01J 35/004; B01J 37/0219; B01J 37/0236; B01J 37/031; B01J 37/04; B01J 37/08; B01J 37/342; B01J 2231/005; B01J 2531/26
USPC .................................. 442/59; 977/762, 775
See application file for complete search history.

(56) References Cited

U.S. PATENT DOCUMENTS

2020/0197901 A1\*  6/2020  Lu ........................ B01J 20/3085
2023/0235502 A1\*  7/2023  Usami ................... D06M 15/05
                                                                    8/115.56

FOREIGN PATENT DOCUMENTS

| CN | 107296308 | 10/2017 | |
| CN | 108208966 | 6/2018 | |
| CN | 109569726 A \* | 4/2019 | ......... B01J 31/1691 |
| CN | 112680884 | 4/2021 | |
| CN | 113322673 A \* | 8/2021 | |
| CN | 102771916 | 11/2021 | |

OTHER PUBLICATIONS

Corma, "Zeolite-based photocatalysts," Chem. Commun., 2004, pp. 1443-1459. (Year: 2004).\*
Woan, "Photocatalytic Carbon-Nanotube-TiO2 Composites," Advanced Materials, 21, 2009, pp. 2233-2239. (Year: 2009).\*

(Continued)

*Primary Examiner* — Matthew D Matzek
(74) *Attorney, Agent, or Firm* — Renner, Kenner, Greive, Bobak, Taylor & Weber (57) ABSTRACT

A self-cleaning fabric having a photocatalyst responsive to UV, visible and IR irradiations for inactivating harmful microorganisms via photocatalysis.

19 Claims, 8 Drawing Sheets

(56) References Cited

OTHER PUBLICATIONS

Wang, "Preparation of Microporous Zeolites TiO2/SSZ-13 composite photocatalyst and its photocatalytic reactivity," Microporous and Mesoporous Materials 250, 2017, pp. 9-17. (Year: 2017).*
Kumar, S., Karmacharya, M., Joshi, S. R., Gulenko, O., Park, J., Kim, G. H., & Cho, Y. K. (2020). Photoactive antiviral face mask with self-sterilization and reusability. Nano Letters, 21(1), 337-343.
Martí, M., Tuñón-Molina, A., Aachmann, F. L., Muramoto, Y., Noda, T., Takayama, K., & Serrano-Aroca, Á. (2021). Protective face mask filter capable of inactivating SARS-CoV-2, and methicillin-resistant *Staphylococcus aureus* and *Staphylococcus epidermidis*. Polymers, 13(2), 207.

\* cited by examiner

SELF-CLEANING FABRIC AND ARTICLE

TECHNICAL FIELD

The invention relates to a self-cleaning fabric and a self-cleaning article, and preparation methods thereof.

BACKGROUND

Fabrics, and non-woven fabrics especially are used for a multitude of products such as, for example, clothing, filtration, etc. However, most existing fabrics and their derived products on the market are incapable of self-cleaning and self-disinfecting. Very few fabric-based products, such as masks, are active in any way and are most typically passive air filters whose effectivity is solely based on their filtration of various particle sizes.

Some active fabrics or filtration materials exist. The use of titanium dioxide is known. However, titanium dioxide is only responsive to ultraviolet radiation and remains ineffective in other irradiation ranges. Active fabrics formed by loading zinc oxide onto traditional fabrics are also available but the level of $Zn^{2+}$ released would cause skin irritation and inflammation.

Furthermore, such active fabrics are mostly not biologically degradable and pose threats to environment after disposal.

SUMMARY

It is an object to provide fabrics with improved photocatalytic effects, improved disinfection, the ability to neutralize/reduce both biological and chemical threats, and/or reduced cytotoxicity. It is also desirable to provide an additive for a fabric which has an improved safety profile and photocatalytic properties without exposure to UV light.

In a first aspect, there is provided a self-cleaning fabric comprising a photocatalyst responsive to UV, visible and IR irradiations, e.g., having a wavelength of from about 200 nm to about 800 nm, or from about 200 nm to about 670 nm, or from about 400 nm to about 800 nm, or from about 400 nm to about 670 nm, for inactivating harmful microorganisms via photocatalysis.

Optionally, the photocatalyst comprises a metal-organic framework-based (MOF-based) photocatalyst or a zeolite-based photocatalyst. The metal-organic framework-based photocatalyst is in the form of nanoparticles and may include a thermally-treated metal-organic framework, such as thermally-treated zeolitic imidazolate framework-8 (ZIF-8). The zeolite-based photocatalyst is in the form of microparticles and may include a carbon-doped zeolite, such as carbon-doped SSZ-13 zeolite.

Optionally, the nanoparticles or the microparticles are attached to a nanofibre, e.g., a carbon-based nanofibre. The carbon-based nanofibre may include a non-biodegradable polymeric material (such as polyvinylidene fluoride) or a biodegradable polymeric material (such as polylactic acid or polybutylene adipate terephthalate). Preferably, the fabric is ultrathin.

In a second aspect, there is provided a self-cleaning article comprising a layer of a self-cleaning fabric. The self-cleaning fabric may be the self-cleaning fabric of the first aspect, or may be another fabric that has self-cleaning ability. The self-cleaning article may be personal protective equipment, such as a face mask or protective clothing.

Optionally, the layer of the self-cleaning fabric is an outer layer being supported by an inner layer. The outer and inner layers may be laminated (e.g., thermally).

Optionally, the inner layer comprises a non-woven fabric. Preferably, the non-woven fabric is biodegradable, such as polylactic acid or polybutylene adipate terephthalate.

Optionally, the self-cleaning fabric and the non-woven fabric are porous.

In a third aspect, there is provided a method of forming a self-cleaning fabric, which may or may not be the fabric of the first aspect. The method comprises the steps of: forming a carbon-based nanofibre by way of electrospinning, and loading a photocatalyst in the form of nanoparticles or microparticles onto a carbon-based nanofibre. Optionally, the steps of forming of the carbon-based nanofibre and loading of the photocatalyst are performed simultaneously.

In one embodiment where the photocatalyst in the form of nanoparticles is a thermally-treated MOF comprises ZIF-8, formation of the thermally-treated MOF comprises the steps of: mixing $Zn(NO_3)_2 \cdot 6H_2O$ with 2-methylimidazole to form a reaction solution containing a precipitate, and separating the precipitate from the reaction solution and drying the precipitate, and thermally treating the separated precipitate to form the nanoparticles of the thermally-treated MOF.

In one embodiment where the photocatalyst in the form of microparticles is a carbon-doped SSZ-13 zeolite, the formation of the carbon-doped SSZ-13 zeolite comprises the steps of: mixing N, N, N-trimethyl-1-adamantanamine hydroxide and tetraethyl orthosilicate in water to form a reaction solution, adding aluminium ethoxide to the reaction solution to form a gel and transferring the gel to an autoclave, heating the autoclave to form a template-containing SSZ-13 zeolite, collecting and drying the template-containing SSZ-13 zeolite, and calcining the template-containing SSZ-13 zeolite to dope carbon into the zeolite.

In a fourth aspect, there is provided a method of forming a self-cleaning article, e.g., the self-cleaning article of the second aspect. The method comprises the steps of: providing a first layer of a self-cleaning fabric, and thermally laminating the first layer to a second layer of a non-woven fabric to support the first layer. The self-cleaning fabric may be the fabric of the first aspect or the fabric formed using the method of the third aspect.

In a fifth aspect, there is provided a method of disinfecting a fabric by exposing the fabric to light having a wavelength of from about 200 nm to about 800 nm and optionally about 200 nm to about 670 nm. The fabric may be the self-cleaning fabric of the first aspect or the self-cleaning fabric formed using the method of the third aspect. The fabric may also be included in the self-cleaning article of the second aspect, or the self-cleaning article formed using the method of the fourth aspect.

BRIEF DESCRIPTION OF THE DRAWINGS

Embodiments of the invention will now be described, by way of example, with reference to the accompanying drawings, in which.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Terms of degree, such as "substantially" or "about" are understood by those of ordinary skill to refer to reasonable ranges outside of the given value, for example, general tolerances associated with manufacturing, assembly, and use of the described embodiments.

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise.

Figure 1:
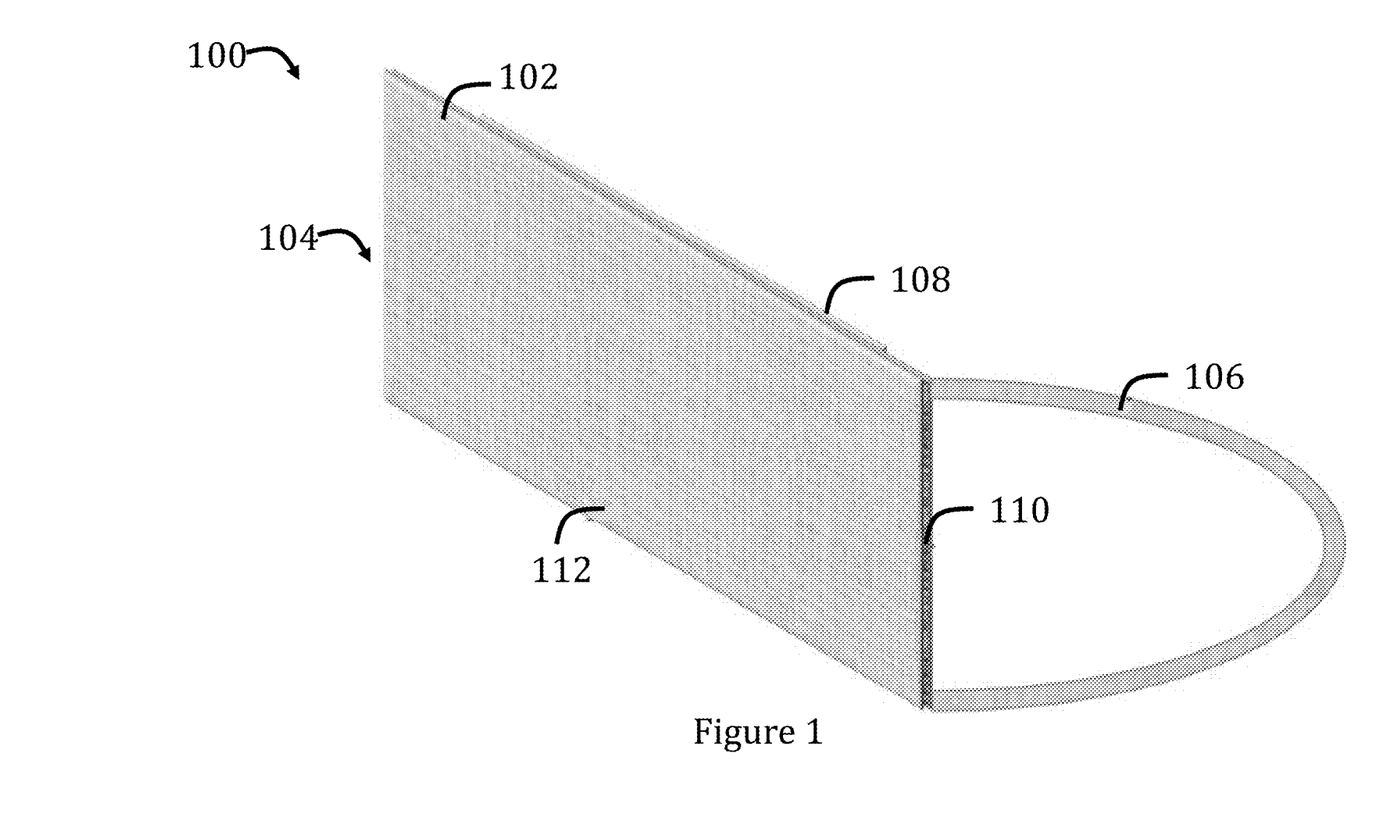
FIG. 1 is a schematic diagram of a self-cleaning article in the form of a face mask being formed from a self-cleaning fabric in accordance with the invention.

FIG. 1 shows an example of a self-cleaning article formed from a self-cleaning fabric 102 in accordance with the invention. The example is a face mask 100. The illustrated face mask 100 is capable of performing functions of most surgical face masks such as filtering air pollutants including hazardous organic pollutants, germs or harmful microorganisms, as well as particulate matter e.g., PM 2.5. Additionally, the mask 100 improves surface electrostatic adherence of dirt or germs including, but not limited to, Gram-negative bacteria (e.g., *E. coli*), viruses, fungi, and protozoa, thereby preventing their escape from an external surface of the mask 100. The mask 100 also rapidly inactivates germs such as bacteria that are adhered to its outer surface (e.g., within 30 minutes), thereby preventing potential secondary contamination.

The mask 100 has a generally rectangular body 104 with a layered or laminated structure for covering the wearer's nose and mouth. Two shorter edges of the body 104 are fixed with respective ear loops 106 (only one is shown in FIG. 1). A flexible element 108 is arranged at the upper longer edge of the mask 100 for adjustment to better fit the nasal bridge of a wearer. The layered or laminated structure has a first, inner layer 110 and a second, outer layer 112. The outer layer 112 is a membrane supported by the inner layer 110. These layers 110 and 112 are in direct engagement, preferably by way of thermal lamination. The two ear loops 106 are elastic cords and the flexible element 108 is a deformable metal strip or wire.

The outer layer 112, with a side exposed to the external environment, is made of the self-cleaning fabric 102 as detailed below. This outer layer 112 functions as a filtering layer as well as a germ inactivating layer. The inner layer 110 faces and is (at least partly) in contact with the wearer's face. The inner layer 110 acts as a further filtering and moisture absorbing layer. In other words, both or at least one of the outer and inner layers 112 and 110 is provided to filter air pollutants. The layer(s) 110, 112 is formed from a porous material that traps unwanted pollutants or promote electrostatic adherence of the pollutants thereon. The self-cleaning fabric 102 that forms the outer layer 112 is preferably water-repelling or hydrophobic.

The self-cleaning fabric 102 that forms the outer layer 112 confers the self-cleaning properties on the mask 100. Such a self-cleaning process is a photocatalytic reaction, which involves the use of a photocatalyst being activated when exposed to an irradiation, thereby interacting with oxygen and water in air to form free radicals that in turn break down or decompose any harmful organic matter deposited on the surfaces of the fabric 102.

In an alternative embodiment, both the outer and inner layers 112 and 110 are made of a self-cleaning fabric. The two layers of self-cleaning fabric can be structurally or materially different and a further supporting layer may be required to offer structural reinforcement. The later structure inactivates germs that come in via bi-directional airflow. While the outer layer 112 prevents external germs from passing through the mask, the inner layer 110 prevents the germs exhaled by the wearer from escaping. When the inner layer 110 exhibits self-cleaning properties, these germs captured therein would be inactivated, thereby preventing the active germs from accumulating which may otherwise cause self-contraction.

The self-cleaning fabric 102 is made up of, at least partly, nanowire(s) and photocatalyst(s). The nanowire (s) is in the form of nanofibre(s) having a diameter of about 100 nm to about 400 nm, and the photocatalyst(s) is in the form of microparticles or nanoparticles, that are attached to the nanofibre. These microparticles or nanoparticles may be coated on or attached to the nanofibre in an evenly distributed manner such that the particles may be evenly distributed on and within the fabric 102. The nanofibres may be prepared by electrospinning technique to electrostatically charge the nanofibres so that air pollutants can be electrostatically adhered to the fabric 102. The nanofibre may be carbon-based, non-biodegradable or biodegradable, e.g., having polyvinylidene fluoride (PVDF), polybutylene adipate terephthalate (PBAT), or polylactic acid (PLA). A biodegradable polymeric material is preferred, such as PLA and PBAT. The photocatalyst may be a metal-organic framework-based (MOF-based) photocatalyst or a zeolite-based photocatalyst, which are topologically isomorphic. The self-cleaning fabric 102, specifically the photocatalyst, is responsive to a wide-spectral irradiation (i.e., including all of UV, visible and IR irradiations, e.g., having a wavelength of from 100 nm to 1 mm, preferably from about 200 nm to about 800 nm, more preferably from about 200 nm to about 670 nm) for inactivating (e.g., killing, inhibiting, or neutralising) harmful microorganisms via photocatalysis.

The MOF-based photocatalyst may be a zeolitic imidazolate framework-8 (ZIF-8). It may include a thermally-treated MOF, such as a thermally-treated zeolitic imidazolate framework-8 (ZIF-8-T). In one embodiment, the MOF-based photocatalyst takes the form of nanoparticles with a diameter of about 90 nm.

The zeolite-based photocatalyst may be a chabazite (CHA), Beta zeolite, and AEI zeolite. It may include a carbon-doped zeolite, such as a carbon-doped SSZ-13, *BEA, and AEI zeolites. In one embodiment, the carbon-doped photocatalyst takes the form of microparticles with a diameter of about 0.5 μm to about 1 μm.

The inner layer 110 of the mask 100 is made of a non-woven fabric, preferably a degradable (either chemically or biologically) non-woven fabric such as PLA and PBAT.

Figure 2:
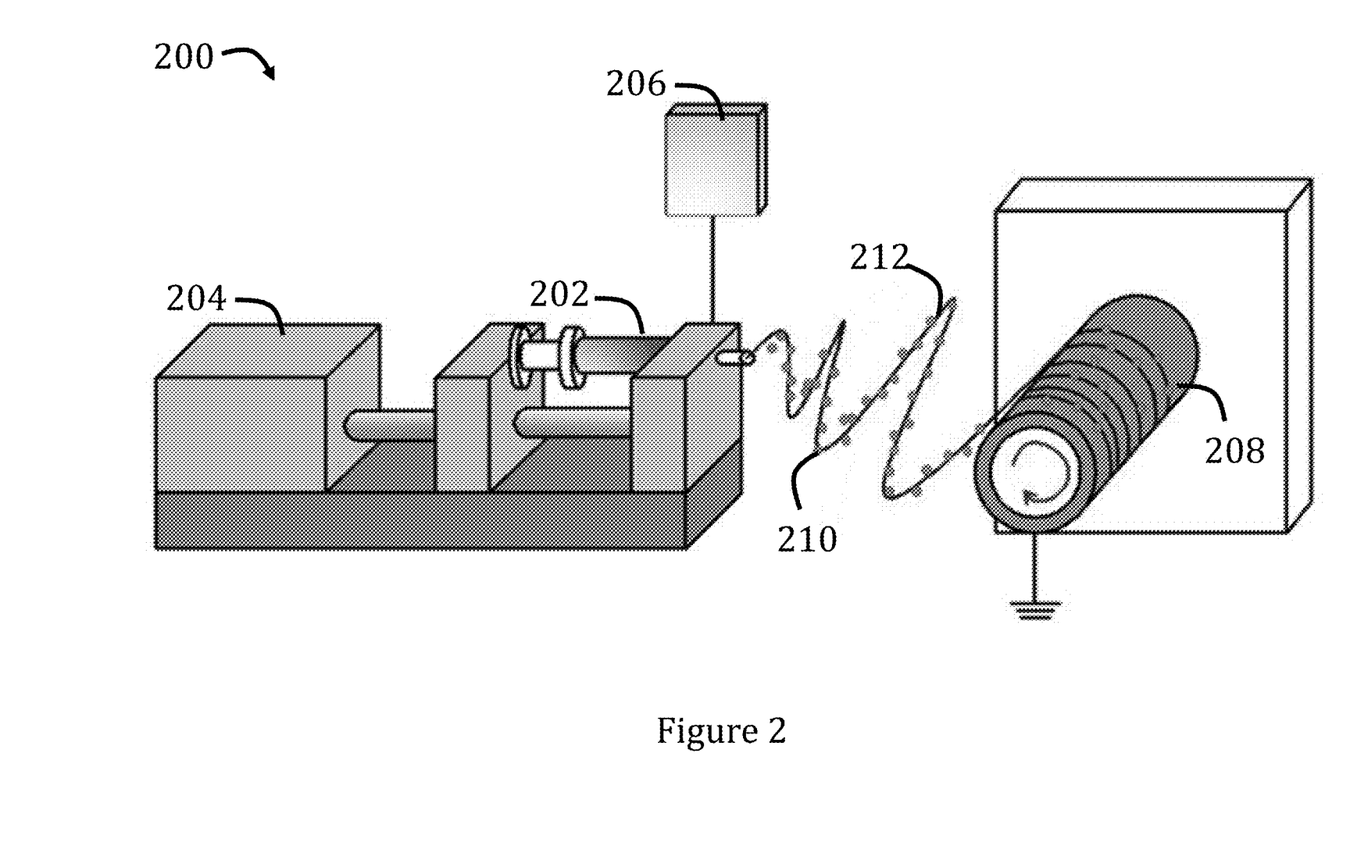
FIG. 2 is a schematic diagram of an electrospinning apparatus for making a fabric.

As discussed above, the self-cleaning fabric 102 in the outer layer 112 of the mask 100 may be formed from electrospun nanofibres. Specifically, the preparation includes the steps of forming the photocatalyst particles (microparticles or nanoparticles) 210 and forming a carbon-based nanofibre 212 by way of electrospinning, e.g., with the use of an electrospinning apparatus 200 (FIG. 2). Then the carbon-based nanofibre 212 is loaded with the photocatalyst particles 210. The steps of forming the nanofibre 212 and loading the particles 210 on to it may be performed substantially simultaneously. For example, the electrospinning process may involve the use of a solution containing the polymeric material for the nanofibre 212 and the particles 210, such that the particles 210 are loaded onto the nanofibre 212 as soon as the nanofibre 212 is formed, e.g., extruded from a syringe of the apparatus 200, as will be explained below.

In an embodiment of the invention where the photocatalyst particles 210 are thermally-treated ZIF-8 nanoparticles, the step of forming the nanoparticles 210 may include mixing $Zn(N03)_2 \cdot 6H_2O$ with 2-methylimidazole to form a reaction solution containing a precipitate, separating the precipitate from the reaction solution and drying the precipitate, and then thermally treating the separated precipitate to form the nanoparticles 210 of the thermally treated ZIF-8.

Specifically, the step of mixing to form a reaction solution containing a precipitate may include dissolving $Zn(NO_3)_2 \cdot 6H_2O$ in methanol for form a $Zn(NO_3)_2 \cdot 6H_2O$ solution, dissolving 2-methylimidazole in methanol to form a 2-methylimidazole solution, adding the $Zn(NO_3)_2 \cdot 6H_2O$ solution to the 2-methylimidazole solution to form a reaction solution, stirring the reaction solution for about 5 minutes to about 5 hours to form a milky white precipitate. The step of separating the precipitate may include filtering (using a 0.1-0.45 μm pore size filter) or centrifuging (at about 5000 r/min to about 20000 r/min for about 1 minute to about 15 minutes) the milky white precipitate and washing the milky white precipitate with methanol about 1 time to about 10 times to remove excess and unreacted raw materials and to form a washed precipitate, drying the washed precipitate at about 35° C. to about 100° C. for about 15 minutes to about 48 hours to form a dried precipitate. The step of thermally treating may include thermally treating the dried precipitate at about 125° C. to about 300° C. for about 5 minutes to about 20 hours to remove any moisture, solvent and to form ZIF-8-T nanoparticles.

In an alternative embodiment, the ZIF-8 may be prepared via other synthesis routes, such as solvothermal, microwave-assisted, sonochemical, mechanochemical, dry-gel, and microfluidic methods, before it is subjected to thermal treatment to form the ZIF-8-T nanoparticles.

The thermal treatment step may change the ligand structure and significantly increase the photocatalytic activity, light harvesting ability, and stability of the nanoparticle, or the MOF nanoparticle, or the photocatalytic MOF nanoparticle. The thermal treatment may reduce the cytotoxicity of the nanoparticle, or the MOF nanoparticle, or the photocatalytic MOF nanoparticle. The increased stability in turn may reduce the release rate of $Zn^2$ ions.

In an embodiment where the photocatalyst 210 is carbon-doped SSZ-13 zeolite microparticle, the step of forming the microparticles 210 may include calcining a template-containing SSZ-13 zeolite under an atmosphere with mixed gases such as oxygen or nitrogen with inert gas(es) (e.g., helium, argon, etc.) to dope carbon into the zeolite. The method may further include the step of forming the template-containing SSZ-13 zeolite.

Specifically, the step of forming the template-containing SSZ-13 zeolite may include mixing N, N, N-trimethyl-1-adamantanamine hydroxide and tetraethyl orthosilicate (TEOS) with deionised (DI) water and stirred for about 1 hour to about 5 hours at from about 15° C. to about 50° C. to form a solution, e.g., using a magnetic stirrer in a glass bottle with a lid, adding aluminium ethoxide to the solution and stirring for from about 0.1 hour to about 5 hours in the same bottle to form a gel. The step of forming may further include transferring the gel into a 100 mL Teflon-lined autoclave and heated at about 100° C. to about 200° C. (with a ramping rate of about $0.1°\,C.\cdot min^{-1}$ to about $20°\,C.\cdot min^{-1}$) for 1 day to 10 days, cooling down the autoclave, e.g., to room temperature, to collect the product, and washing the product with DI water and dried at about 35° C. to about 100° C. in an oven overnight.

The step of calcining may be performed in an AutoChem 2950 HP chemisorption analyser (Micromeritics Instruments Corp., USA). This step may include placing an appropriate amount (e.g., about 0.1 g to about 2 g) of quartz wool in a reactor to hold the sample, loading the template-containing SSZ-13 zeolite on the quartz wool inside the reactor equipped with the chemisorption analyser, heating the zeolite (with a ramping rate of about $0.1°\,C.\cdot min^{-1}$ to about $20°\,C.\cdot min^{-1}$) at about 15'C to about 800° C. and then held at about 450° C. to about 800'C for about 2 hours to about 24 hours, while being exposed to an $O_2$/He mixed gas flow (from about 10 $mL\cdot min^{-1}$ to about 40 $mL\cdot min^{-1}$) throughout the heating process. Specifically, during the calcination process, an appropriate amount of about 10 vol % $O_2$ in He is balanced with pure He to obtain the gas flow containing about 0% to about 10 vol % $O_2$ in He. The calcination process is precisely controlled to dope carbon into the zeolite framework using the parent zeolite as the carbon source.

In an alternative embodiment, the template-containing SSZ-13 zeolite may be prepared with other raw materials, such as other templates (e.g., N, N, N-trimethyl-1-adamant ammonium hydroxide, benzyl trimethyl ammonium hydroxide and their mixture), other silicon-containing compounds (e.g., silica sol, silica gel, tetraethyl orthosilicate), other aluminium-containing compounds (e.g., aluminium oxide, pseudo-boehmite, aluminium hydroxide, aluminium sulphate), before it is subjected to calcination for carbon doping.

The doping contributes to reducing the bandgap energy of zeolite, facilitating electron transfer, and suppressing the recombination of charge carriers, hence may significantly improve photocatalytic activity and assist in initiating visible light activity.

The substantially simultaneous steps of forming the nanofibre and loading the particles may include combining the particles, the polymeric material of the nanofibre (e.g., PVDF, PLA, or PBAT) and a solvent (e.g., dimethylformamide when PVDF is used, or dichloromethane when PLA is used) to form a mixture, stirring the mixture to form a homogenous suspension, and electrospinning the homogenous suspension to form a nanowire.

In more detail, the step of electrospinning may include dispensing the homogenous suspension from a syringe to form a strand and elongating the strand within an electric field. The electrospinning of the homogenous suspension into a nanowire may, for example, evenly load the particles onto the nanowires and improve mechanical strength. Fabrics formed from electrospun nanowires are ultrathin (with a thickness of about 0.02 mm to about 0.1 mm) and breathable.

As mentioned, the step of electrospinning may be performed with the electrospinning apparatus 200 in FIG. 2. The apparatus 200 includes a syringe 202 containing a solution with the polymeric material (e.g., PVDF) and the particles (ZIF-8-T nanoparticles or carbon-doped SSZ-13 zeolite microparticles), a pump 204 connected to the syringe 202 for driving the solution out of the syringe 202, thereby injecting the solution through a nozzle of the syringe 202. The apparatus 200 also includes a high-voltage direct current (DC) power supply 206 for applying an electric field for producing fibres 212 with a diameter in the nanometre scale, and a grounded roller collector in the form of a rotating mandrel 208 at a predetermined rotational speed of about 20 r/min to about 200 r/min, facilitating windup of the fibres 212 in a common direction thus allowing aligned fibres to be obtained. Upon application of the high electrical field of above 1 kV/cm provided by the high-voltage power supply 206, the droplet at the tip of the nozzle will be extruded and elongated upon being driven by the pump 204. When a threshold voltage is reached, e.g., when the electric traction force exceeds the surface tension force of polymeric droplet at the tip of the nozzle, a Taylor Cone can be observed. Upon leaving the syringe 202, the solvent evaporates, and a solid fibre is formed, and then wound around the roller collector 208. In one embodiment, the voltage is about 5 kV to about 50 kV; the injection rate is about 0.001 mL/min to about 0.2 mL/min. As will be appreciated by a person skilled in the art, other parameters of the electrospinning process, such as electric current, temperature, humidity, etc., may be controlled as required.

The resultant fibre is further processed into yarn, and ultimately fabric 102, through one or more of the following processes: spinning, washing dyeing, treating, knitting and weaving.

The resultant fabric 102 may then be processed to form a self-cleaning article, e.g., the face mask 100. This may include cutting the fabric 102 into suitable shape and size, then laminating (e.g., thermally) the fabric 102 to a layer of non-woven fabric.

Hereinafter, the present invention is described more specifically by way of examples, but the present invention is not limited thereto.

EXAMPLE 1

Preparation of Thermally-Treated ZIF-8 Nanoparticles

To produce the ZIF-8 nanoparticles, 0.7332 g of Zn (N03)$_2$·6H$_2$O is dissolved in 50 mL methanol to form a Zn(NO$_3$)$_2$·6H$_2$O solution. Next, 1.6225 g of 2-methylimidazole is dissolved in 50 mL methanol to form a 2-methylimidazole solution. Then the Zn(N03)$_2$·6H$_2$O solution is rapidly added into the 2-methylimidazole solution within 30 seconds to form a reaction solution. The reaction solution is stirred for 1 hour at room temperature. A milky white precipitate forms in the reaction solution. The milky white precipitate is centrifuged at 5000 r/min to 20000 r/min for 1 minute to 15 minutes and washed with methanol for 5 times to remove any remaining reaction solution to form a washed precipitate (i.e., ZIF-8). The ZIF-8 is dried at 60° C. for above 2 hours to form a dried precipitate. The dried precipitate is thermally treated at 200° C. in an oven under ambient air pressure and atmosphere for 1 hour to 7 hours to generate the thermally-treated ZIF-8 nanoparticles.

EXAMPLE 2

Preparation of a template-containing parent SSZ-13 zeolite A template-containing parent SSZ-13 zeolite is first prepared by mixing 39.6 g of N, N, N-trimethyl-1-adamantanamine hydroxide (TMAdaOH, 25 wt %, Sachem Inc.) and 19.5 g of tetraethyl orthosilicate (TEOS, Sigma 98%) with 4.05 g of deionised (DI) water and stirred for 2 hours at room temperature using a magnetic stirrer in a glass bottle with a lid. Then, 1.05 g of aluminium ethoxide (Strem Chemical, 99%) is added to the solution and stirred for another 1 hour in the same bottle to form a gel. Subsequently, the gel is transferred into a 100 mL Teflon-lined autoclave and heated at 140° C. (with a ramping rate of 2° C.·min$^{-1}$) for 6 days. After that, the autoclave is cooled down to room temperature to collect the product. Finally, the product is washed with DI water and dried at 80° C. in an oven overnight.

Preparation of Carbon-Doped SSZ-13 Zeolite Microparticles

To produce the carbon-doped SSZ-13 zeolite, the template-containing parent zeolite is calcinated under a mixed O$_2$/He atmosphere in an AutoChem 2950 HP chemisorption analyser (Micromeritics Instruments Corp., USA). An appropriate amount of quartz wool is placed in the bottom of a U-shaped tubular quartz reactor to hold the sample. Then, 0.5 g of the parent zeolite is loaded on the quartz wool inside the reactor equipped with the chemisorption analyser. The zeolite is heated (with a ramping rate of 2° C.·min$^{-1}$) from room temperature to 550° C. and then held at 550° C. for 8 hours, while being exposed to an O$_2$/He mixed gas flow (20 mL·min$^{-1}$) throughout the heating process. To prepare the desired carbon-doped SSZ-13 zeolite microparticles, an appropriate amount of 10 vol % Oz in He is balanced with pure He to obtain the gas flow containing approximately 5 vol % O$_2$ in He.

Preparation of Pristine (Non-Doped) SSZ-13 Zeolite Microparticles

Pristine zeolite without carbon doping is prepared by calcining the above template-containing parent SSZ-13 zeolite (0.5 g) under an air atmosphere with a ramping rate of 2° C.·min$^{-1}$ to 550° C. and held at 550° C. for 8 hours in a tube furnace.

EXAMPLE 3

Preparation of Fabric with Photocatalyst Particles

To prepare the fabric of the present invention, 0.9 g of the photocatalyst particles, in powder form, from Example 1 or Example 2 (thermally-treated ZIF-8 nanoparticles or carbon-doped SSZ-13 zeolite microparticles) and 1.5 g of polyvinylidene fluoride (PVDF) are added into 10 mL of dimethylformamide (DMF). The mixture is stirred for 8 hours at room temperature to form a homogeneous suspension. The homogeneous suspension is transferred into a 20-mL syringe (with a $\Phi=0.33$ mm stainless-steel needle) that is fixed in an electrospinning machine (e.g., the apparatus 200 in FIG. 2). The distance between roller collector and the syringe needle (tip) is 20 cm. The output voltage of the power supply is 15 kV. The injection rate is 0.01 mL/min.

Preparation of Bare (Control) Fabric

The bare fabric without MOF or zeolite particles is prepared using the same procedures as described above, except that no MOF or zeolite particles are added in the first step.

Structure Characterisation

Figure 3A:
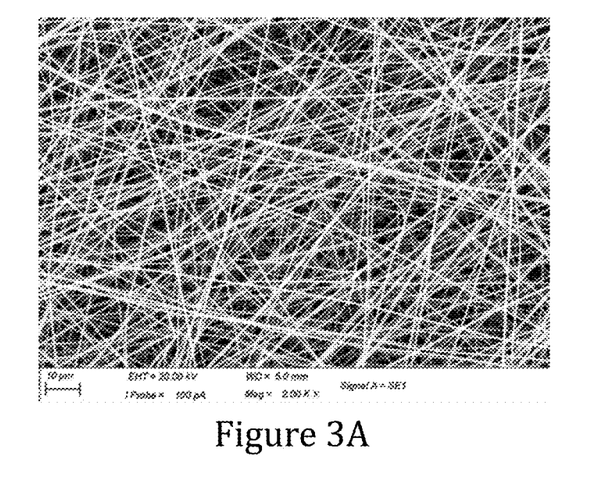
FIG. 3A is a scanning electron microscopic (SEM) image of a bare fabric.
Figure 3B:
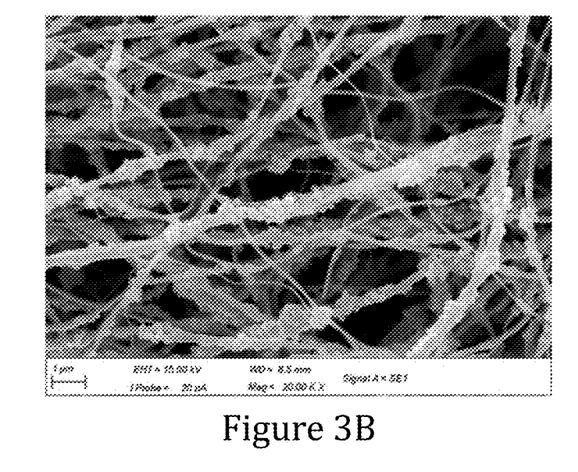
FIG. 3B is an SEM image of a thermally-treated ZIF-8 fabric, also known as ZIF-8-T fabric.
Figure 3C:
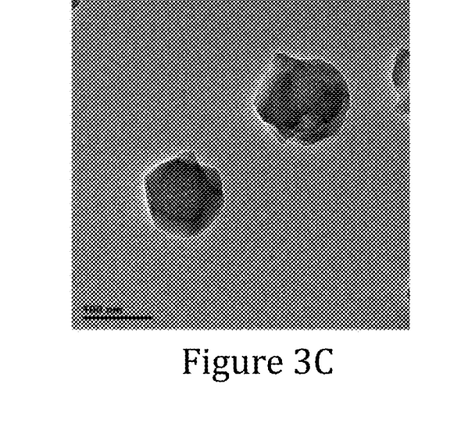
FIG. 3C is a transmission electron microscopic (TEM) image of ZIF-8-T nanoparticles.
Figure 3D:
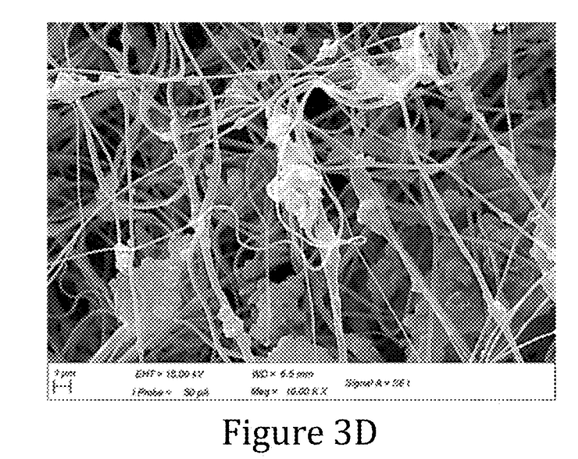
FIG. 3D is an SEM image of a carbon-doped SSZ-13 zeolite fabric.

The morphology of the as-prepared fabrics is observed using a scanning electron microscope (SEM). Bare fabric is composed of numerous nanowires each with a diameter of about 100-400 nm (FIG. 3A). As shown in FIG. 3B, in ZIF-8-T fabric, ZIF-8-T nanoparticles (with a diameter of about 90 nm; FIG. 3C) are evenly loaded onto the nanowires. As shown in FIG. 3D, in the carbon-doped zeolite fabric, the carbon-doped SSZ-13 zeolite particles are adhered to the nanowires with some aggregations, which are believed to pose negligible effects on the performance of the fabric.

Light Absorption Ability

Figure 4A:
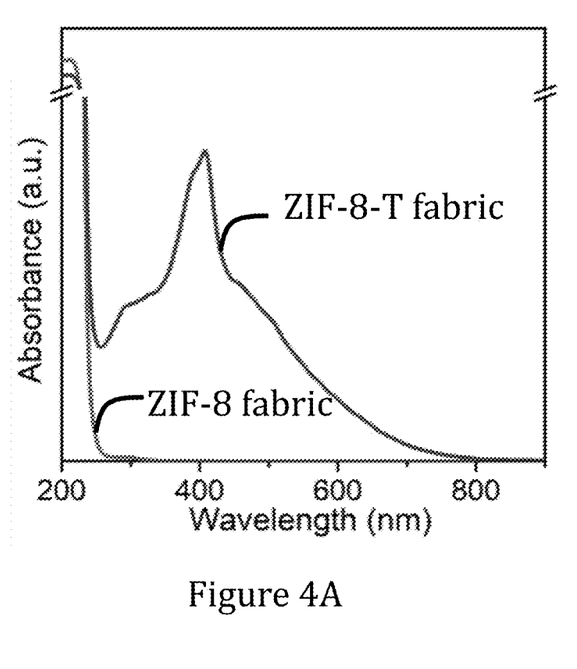
FIG. 4A is a graph showing the UV-vis diffuse reflectance spectroscopy (DRS) spectra of different ZIF-8 fabrics.
Figure 4B:
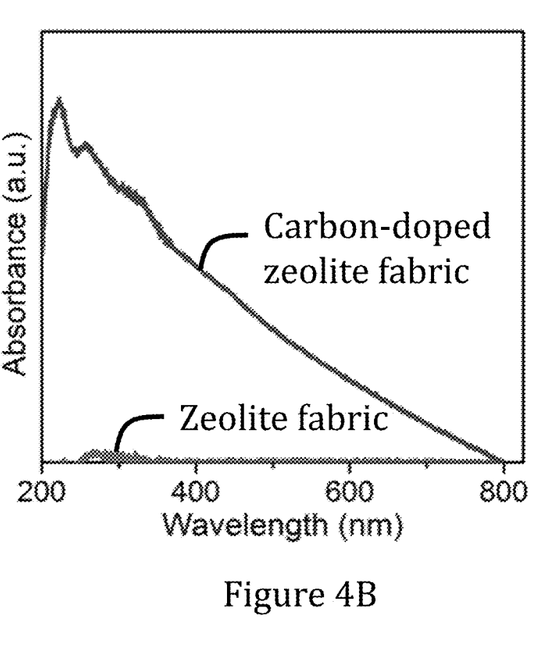
FIG. 4B is a graph showing the UV-vis DRS spectra of different zeolite fabrics.

The light absorption ability of the as-prepared fabrics is examined by UV-vis diffuse reflectance spectroscopy (DRS). FIG. 4A shows the absorbance of a ZIF-8 fabric compared to a ZIF-8-T fabric. Specifically, the ZIF-8 fabric only shows absorbance at the UV region (<270 nm), while the ZIF-8-T fabric exhibits strong absorbance at the UV, visible, and near-infrared (NIR) regions (with a wavelength of about 200 nm to about 800 nm and preferably of about 200 nm to about 670 nm). FIG. 4B shows the absorbance of a pristine zeolite fabric compared to a carbon-doped zeolite fabric. Specifically, the pristine zeolite fabric has a very small absorbance at the UV region, while the carbon-doped zeolite fabric shows intensive and broad absorbance from UV to NIR regions.

Photoelectrochemical Property

Figure 5A:
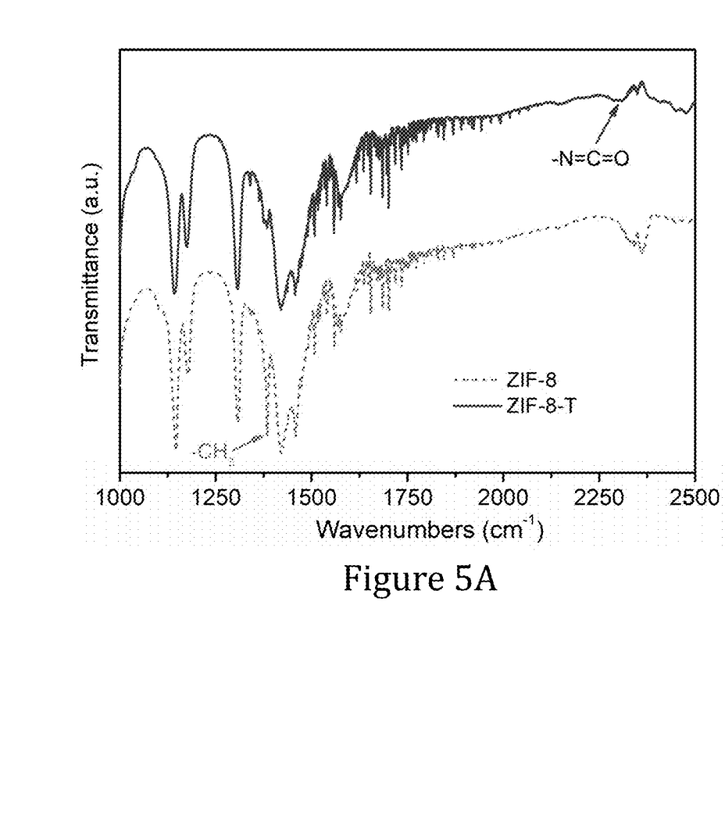
FIG. 5A is a graph showing the Fourier-transform infrared spectroscopy (FT-IR) spectra of ZIF-8 and ZIF-8-T nanoparticles.

The changes of ligand structure in ZIF-8 upon thermal treatment is determined by Fourier-transform infrared spectroscopy (FT-IR). FIG. 5A shows the appearance of a new peak at 2223 $cm^{-1}$ and the significantly decreased peak intensity at 1380 $cm^{-1}$, indicating the generation of —N═C═O group and the dissociation of —$CH_3$ group in ZIF-8 ligand caused by thermal treatment.

Figure 5B:
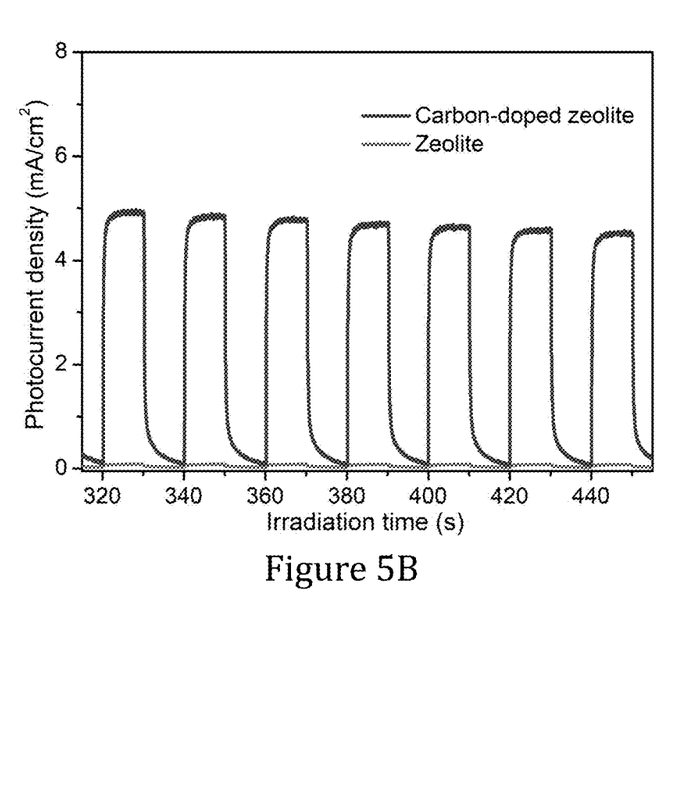
FIG. 5B is a graph showing the photocurrent density of pristine and carbon-doped SSZ-13 zeolites.
Figure 5C:
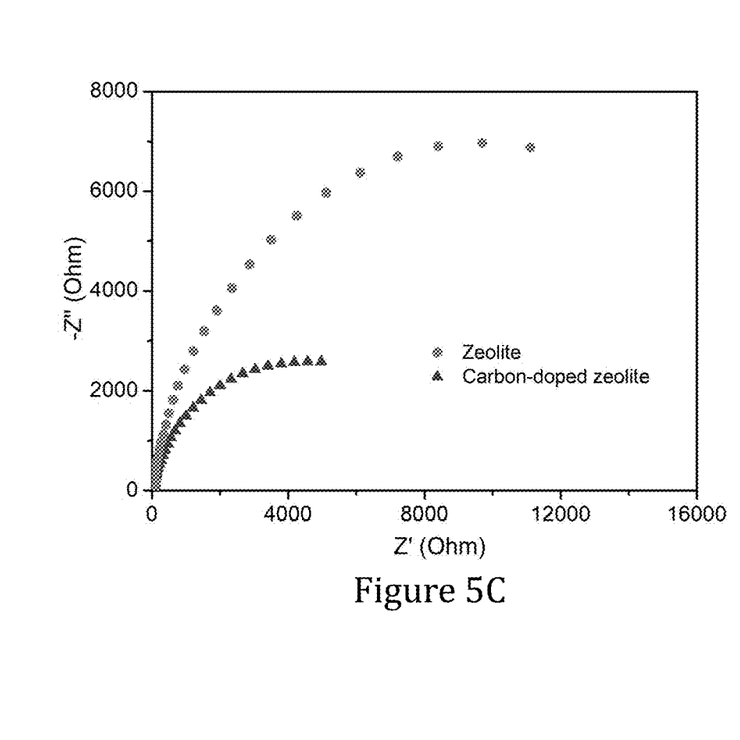
FIG. 5C is a graph showing the electrochemical impedance spectroscopy (EIS) Nyquist plots of pristine and carbon-doped SSZ-13 zeolites.
Figure 5D:
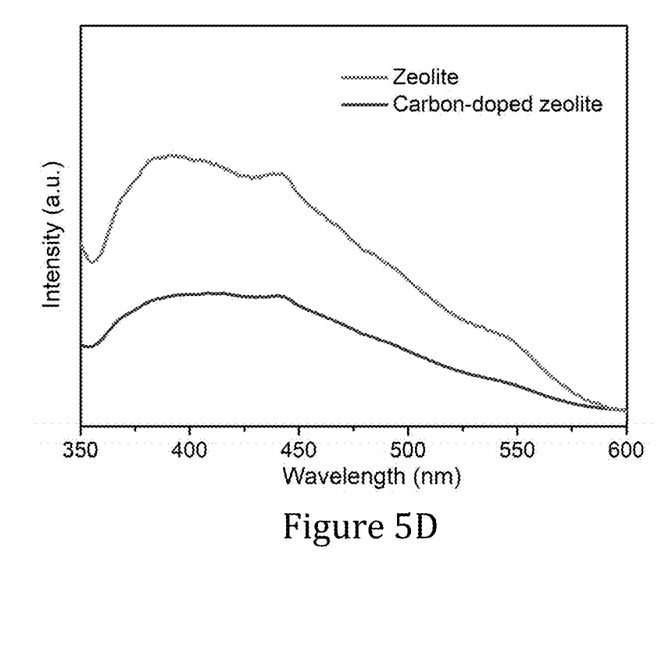
FIG. 5D is a graph showing the photoluminescence of pristine and carbon-doped SSZ-13 zeolites.

FIG. 5B shows the significantly high photocurrent intensity in the carbon-doped SSZ-13 zeolite under visible light, demonstrating carbon doping may lead to the generation of abundant charge carriers and more efficient electron transfer. Compared with the pristine zeolite, the smaller diameter of EIS Nyquist plots (FIG. 5C) and the lower photoluminescence (FIG. 5D) of the carbon-doped zeolite suggest the lower electron transfer resistance and the reduced charge carrier recombination due to carbon doping.

These results indicate the applicability of ZIF-8-T and carbon-doped SSZ-13 zeolites as a photocatalyst.

Photocatalytic Bacterial Inactivation

Five separate sample fabric membranes (each being 15 $cm^2$) are prepared with a blank fabric, a ZIF-8 fabric, and a ZIF-8-T fabric, a pristine zeolite fabric, and a carbon-doped zeolite fabric, respectively. The photocatalytic activity of fabrics is investigated by inactivating *E. coli* K-12 bacterium in air under visible light (FIGS. 6A and 6B).

*E. coli* K-12-containing aerosols with a diameter of 1 μm to 5 μm that are generated from $10^9$ (colony-forming unit) $CFU \cdot mL^{-1}$ of bacteria suspension are prepared as model-infected aerosols. Each fabric is exposed to a 0.3 $mL \cdot min^{-1}$ flow of the *E. coli* K-12-containing aerosols for 5 minutes, at which the initial cell density on the fabric surface is about $3 \times 10^9$ CFU. After that, the bacteria-contaminated fabric is either placed in the dark for 30 minutes to evaluate the cytotoxicity, or irradiated by visible light (with a xenon lamp, $\lambda \geq 400$ nm, 300 W) for 30 minutes to examine the photocatalytic activity. Both fabrics are subsequently fully washed with 25 mL of saline solution to collect all the adhered bacteria. Finally, 100 μL of the collected bacterial suspension is diluted and evenly spread onto nutrient agar plates and incubated at 37° C. for 18 hours in the dark to calculate the bacterial population.

Figure 6A:
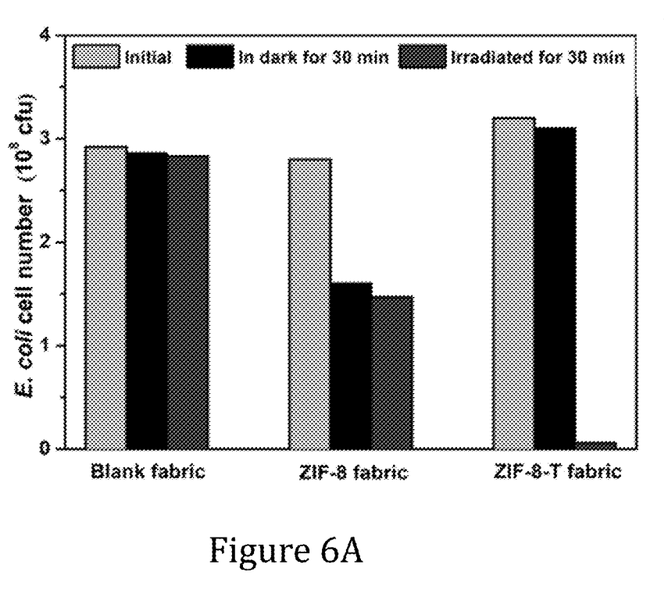
FIG. 6A is a graph showing the comparison of the photocatalytic air disinfection against *E. coli* K-12 bacterium by different ZIF-8 fabrics and a bare fabric.
Figure 6B:
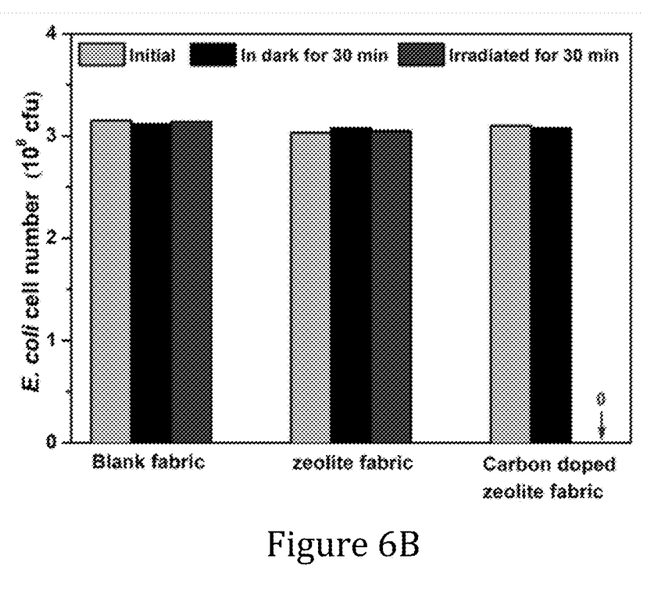
FIG. 6B is a graph showing the comparison of the photocatalytic air disinfection against *E. coli* K-12 bacterium by different zeolite fabrics and a bare fabric.

FIGS. 6A and 6B show that the blank fabric without MOFs/zeolite photocatalyst cannot inactivate bacteria either in dark or upon being irradiated. As shown in FIG. 6A, ZIF-8-T fabric exhibits outstanding photocatalytic bacterial inactivation performance, with 98.13% *E. coli* K-12 cells being inactivated within 30 minutes under visible light. In addition, the tiny decrease in cell density in dark demonstrates the negligible cytotoxicity of ZIF-8-T fabric. By contrast, ZIF-8 (without thermal treatment) fabric has high cytotoxicity, as suggested by the significant cell population decrease (42.86%) after being placed in dark for 30 minutes. The high cytotoxicity may be attributable to the high release of $Zn^{2+}$ ions. The visible-light photocatalytic antibacterial activity of ZIF-8 fabric is low, because the bacterial inactivation under visible light is only improved by 4.64% compared with that in dark.

As shown in FIG. 6B, the carbon-doped SSZ-13 zeolite fabric shows no cytotoxicity and excellent photocatalytic antibacterial activity (no live *E. coli* is found), realising 100% visible-light-driven bacterial inactivation within 30 minutes. In contrast, pristine SSZ-13 zeolite (without carbon doping) fabric has no cytotoxicity and visible-light photocatalytic activity.

These experimental results demonstrate the ZIF-8-T fabric and the carbon-doped SSZ-13 zeolite fabric are efficient in inactivating about $3.2 \times 10^8$ cfu/mL of *E. coli* bacteria, within 30 minutes under indoor visible light.

Filtration Efficiency Testing

The filtration efficiency of each of the ZIF-8-T and the carbon-doped zeolite fabrics against PM 2.5 and *E. coli* bacterium is tested by forming the fabric into a filter (with a diameter of 12 cm). PM 2.5 and *E. coli* aerosols are produced in a closed box connected to two Aerosol monitors (DustTrak II Aerosol Monitor 8532) fitted with an inbuilt suction pump. Specifically, for monitoring the PM 2.5 concentrations during the membrane efficiency evaluation these Aerosol monitors are fitted with 2.5 μm which allow only PM 2.5 to pass through. One of the Aerosol monitors (DT-1) directly connected to the box serves as a control measuring the total PM 2.5 and *E. coli* bacterium concentrations in the closed box without filtration, and the other Aerosol monitor (DT-2) connected through the membrane module measures such concentrations after filtration.

Figure 7A:
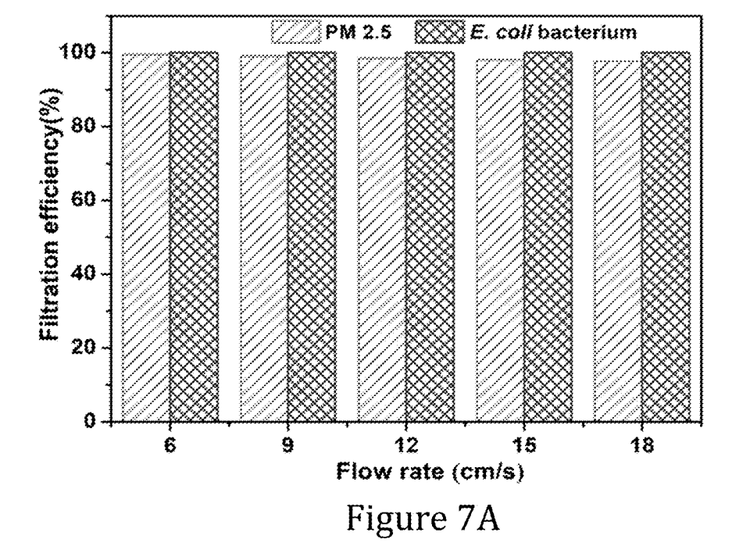
FIG. 7A is a graph showing the filtration efficiency of ZIF-8-T fabric.
Figure 7B:
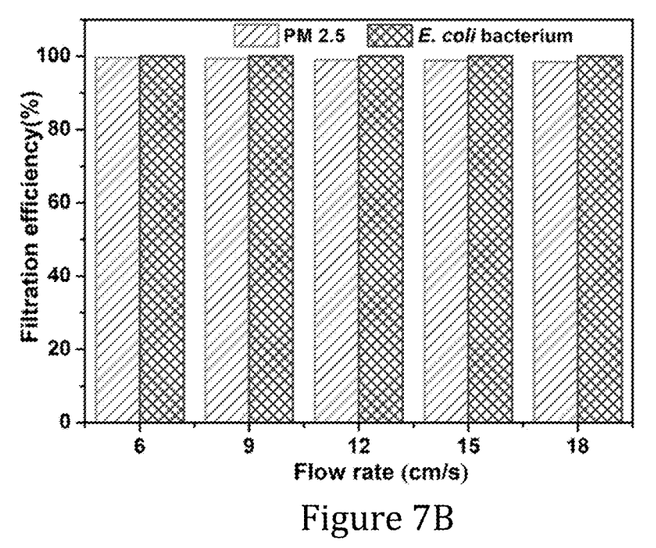
FIG. 7B is a graph showing the filtration efficiency of carbon-doped SSZ-13 zeolite fabric.

FIGS. 7A and 7B show the filtration efficiency of a ZIF-8-T fabric and a carbon-doped zeolite fabric, respectively. Both FIGS. 7A and 7B show that the fabric exhibits high filtration performance against fine particulate matter (e.g., PM 2.5) of about 97.7-99.5% and *E. coli* K-12 bacterial cells of about 100% under flow rate ranging from 6 to 18 cm/s. Thus, this indicates the high potential of using these fabrics in personal protective equipment such as a mask, a surgical mask, a facial mask, etc.

The above embodiments provide a wide-spectral (from UV to IR) responsive, low cytotoxicity, degradable, and antibacterial self-cleaning fabric that can be used in self-cleaning articles, such as face masks. The mask can not only effectively inactivate bacteria and viruses via photocatalysis but also block particulate matter (e.g., PM 2.5) with a filtering efficiency of over 97.7% against PM 2.5 particles via filtration, electrostatic adherence, and porous material adherence. This mask also shows excellent gas permeability and wear comfort. Upon wide-spectral irradiations such as sunlight and even indoor light irradiation, this mask is able to rapidly kill various kinds of bacteria adhered on mask surface. This mask is also a "green" product because it can be reused and degraded after disposal without causing environmental pollutions.

It will be appreciated by persons skilled in the art that numerous variations and/or modifications may be made to the invention as shown in the specific embodiments without departing from the spirit or scope of the invention as broadly described. The described embodiments of the invention should therefore be considered in all respects as illustrative, not restrictive.

For example, the mask may be disposable. The mask may have other size and shape (e.g. generally circular, generally pear-shaped, etc.). Although health-care and clinical and personal protection applications are preferred, the nanoparticles, microparticles, nanowires, fabrics, non-woven fabrics described herein may be applied to various applications such as wastewater treatment. Accordingly, the self-cleaning article may be other wearable items (e.g., personal protective equipment such as protective clothing) or non-wearable items, indoor or outdoor items. For example, the self-cleaning article may be a filter (e.g., for an HVAC system, a personal fan, an air conditioner, a vacuum cleaner, etc.), a sheet, a tablecloth, a curtain, a tablecloth, a wallpaper, a sunshade, a tent, etc.

The invention claimed is:

1. A self-cleaning fabric, comprising:
a plurality of photocatalyst particles responsive to UV, visible and IR irradiations for inactivating harmful microorganisms via photocatalysis;
wherein the photocatalyst comprises a metal-organic framework-based photocatalyst or a zeolite-based photocatalyst; particles of the metal-organic framework-based photocatalyst or the zeolite-based photocatalyst are attached to a nanofibre; the nanofibre is a carbon-based nanofibre; and the carbon-based nanofibre comprises a polymeric material selected from a group consisting of polyvinylidene fluoride, polylactic acid and polybutylene adipate terephthalate.

2. The self-cleaning fabric of claim 1, wherein the zeolite-based photocatalyst comprises a carbon-doped zeolite.

3. The self-cleaning fabric of claim 2, wherein the carbon-doped zeolite is a carbon-doped SSZ-13 zeolite.

4. The self-cleaning fabric of claim 1, wherein the metal-organic framework-based photocatalyst comprises a thermally-treated metal-organic framework.

5. The self-cleaning fabric of claim 4, wherein the thermally-treated metal-organic framework comprises thermally-treated zeolitic imidazolate framework-8 (ZIF-8).

6. The self-cleaning fabric of claim 1, wherein the metal-organic framework-based photocatalyst is in the form of nanoparticles.

7. The self-cleaning fabric of claim 1, wherein the zeolite-based photocatalyst is in the form of microparticles.

8. The self-cleaning fabric of claim 1, wherein the irradiation has a wavelength of from about 200 nm to about 800 nm.

9. A self-cleaning article comprising a layer of the self-cleaning fabric of claim 1, wherein the layer of the self-cleaning fabric is an outer layer being supported by an inner layer; the inner layer comprises a non-woven fabric; and the non-woven fabric comprises polylactic acid or polybutylene adipate terephthalate.

10. The self-cleaning article of claim 9, wherein the non-woven fabric is biodegradable.

11. The self-cleaning article of claim 9, wherein the self-cleaning fabric and the non-woven fabric are porous.

12. The self-cleaning article of claim 9, wherein the outer and inner layers are thermally laminated.

13. The self-cleaning article of claim 9 comprises personal protective equipment.

14. The self-cleaning article of claim 13, wherein the personal protective equipment is a face mask or protective clothing.

15. A method of forming the self-cleaning fabric of claim 1, comprising the steps of:
forming a carbon-based nanofibre by way of electrospinning; and
loading the photocatalyst in the form of nanoparticles or microparticles onto the carbon-based nanofibre.

16. The method of claim 15, wherein the steps of forming of the carbon-based nanofibre and loading of the photocatalyst are performed simultaneously.

17. The method of claim 15, wherein the photocatalyst in the form of nanoparticles is a thermally-treated metal-organic framework comprising zeolitic imidazolate framework-8 (ZIF-8), and wherein formation of the thermally-treated metal-organic framework comprises the steps of:
mixing $Zn(NO_3)_2 \cdot 6H_2O$ with 2-methylimidazole to form a reaction solution containing a precipitate;
separating the precipitate from the reaction solution and drying the precipitate; and
thermally treating the separated precipitate to form the nanoparticles of the thermally-treated metal-organic framework.

18. The method of claim 15, wherein the photocatalyst in the form of microparticles is a carbon-doped SSZ-13 zeolite, and wherein formation of the carbon-doped SSZ-13 zeolite comprises the steps of:
mixing N, N, N-trimethyl-1-adamantanamine hydroxide and tetraethyl orthosilicate in water to form a reaction solution;
adding aluminium ethoxide to the reaction solution to form a gel and transferring the gel to an autoclave;
heating the autoclave to form a template-containing SSZ-13 zeolite;
collecting and drying the template-containing SSZ-13 zeolite; and
calcining the template-containing SSZ-13 zeolite to dope carbon into the zeolite.

19. A method of forming a self-cleaning article comprising:
- providing a first layer of a self-cleaning fabric according to claim 1; and
- thermally laminating the first layer to a second layer of a non-woven fabric to support the first layer;
- wherein the first layer is an outer layer, wherein the second layer is an inner layer, wherein the outer layer is supported by the inner layer, and wherein the non-woven fabric comprises polylactic acid or polybutylene adipate terephthalate.

* * * * *